United States Patent [19]

Dobson

[11] 4,310,135

[45] Jan. 12, 1982

[54] PLATE MOUNTING CLIP

[76] Inventor: Charles E. Dobson, Rambles, Knole Park, Almondsbury, Bristol, England

[21] Appl. No.: 84,576

[22] Filed: Oct. 15, 1979

[30] Foreign Application Priority Data

Oct. 19, 1978 [GB] United Kingdom ............... 41232/78

[51] Int. Cl.[3] ........................ F16M 13/00; G09F 7/18

[52] U.S. Cl. ................................................. 248/221.4

[58] Field of Search ............... 248/201, 251, 254, 255, 248/263, 221.4, DIG. 6, DIG. 9

[56] References Cited

U.S. PATENT DOCUMENTS

| | | | |
|---|---|---|---|
| 1,961,728 | 6/1934 | Arnest et al. | 248/DIG. 6 |
| 2,126,114 | 8/1938 | Jett | 248/DIG. 6 |
| 2,439,091 | 4/1948 | Keating | 248/DIG. 6 |
| 2,451,884 | 10/1948 | Stelzer | 248/251 |
| 2,479,452 | 8/1949 | Albero | 248/254 |
| 2,606,667 | 8/1952 | Hornick | 248/251 X |
| 2,974,918 | 3/1961 | Voigtlander | 248/201 |
| 3,597,867 | 8/1971 | Bailey | 40/10 |
| 3,895,769 | 7/1975 | Hagaman | 248/DIG. 9 |
| 4,059,914 | 11/1977 | Dobson | 40/605 X |

FOREIGN PATENT DOCUMENTS

| | | | |
|---|---|---|---|
| 1257565 | 2/1961 | France | 248/251 |
| 65694 | 7/1913 | Switzerland | 248/263 |
| 558969 | 2/1975 | Switzerland . | |
| 984136 | 2/1965 | United Kingdom . | |
| 1047980 | 11/1966 | United Kingdom . | |
| 1065982 | 4/1967 | United Kingdom . | |
| 1235959 | 6/1971 | United Kingdom . | |
| 1330005 | 9/1973 | United Kingdom . | |
| 1498797 | 1/1978 | United Kingdom . | |

*Primary Examiner*—William H. Schultz
*Attorney, Agent, or Firm*—Cushman, Darby & Cushman

[57] ABSTRACT

A mounting clip for a shallow channel section plate has a flat base with a pair of outwardly convex ribs onto which the plate is a resilient push fit. An end flange projects from the base to close the end of the channel, and can be broken away if not required, so that the clip can be used intermediate the ends of the plate. Three apertures in the base are elongate to allow adjustment of the clip on mounting screws so that the end flange is flush with the end of the plate. The plates can be screwed together back-to-back by connectors.

5 Claims, 3 Drawing Figures

PLATE MOUNTING CLIP

FIELD OF THE INVENTION

This invention relates to the mounting of plates, for example sign plates, to a supporting surface such as a wall or door. More particularly it is concerned with plates which are of shallow channel cross-section having rearwardly directed flanges with mutually convergent portions on their facing surfaces.

BACKGROUND OF THE INVENTION

It is known, for example from my U.K. Pat. No. 1,532,995, to mount the plates to a supporting surface by means of a pair of elongate mounting members spaced apart and extending parallel to each other and at right angles to the plates, the mounting members having a series of pairs of ribs adapted to co-operate with the rearward flanges of the plates so that the plates are a resilient push fit on the mounting members, the width of the plates between their flanges being a multiple of the unit centre-to-centre spacing of adjacent pairs of ribs so that different widths of plates can be mounted to the same mounting members. Separate end closure members for the plates can also be provided to give a neat finished appearance. The present invention seeks to simplify this arrangement and the equipment necessary when a plate of predetermined width is to be mounted to a support.

SUMMARY OF THE INVENTION

According to the present invention there is provided a mounting clip for a plate of shallow channel cross-section having rearwardly directed flanges with mutually convergent portions on their facing surfaces, the clip having a flat base member for securing to a support surface, a pair of ribs projecting from opposite edges of the base member, the mutually remote surfaces of the ribs having divergent portions for co-operating with the convergent portions of the flanges of a said plate clipped thereto, and an end flange projecting from the base member and extending between the ribs for closing the end of the channel of the plate. The end flange is preferably separable from the base member by a line of weakening, so that it can be broken away when not required. The base member suitably has apertures by means of which it can be screwed to a support surface. The apertures are preferably elongate in the direction parallel to said ribs. There are preferably two outer apertures adjacent the ribs and a central aperture midway between them.

BRIEF DESCRIPTION OF THE DRAWINGS AND DESCRIPTION OF PREFERRED FORMS

Figure 1:
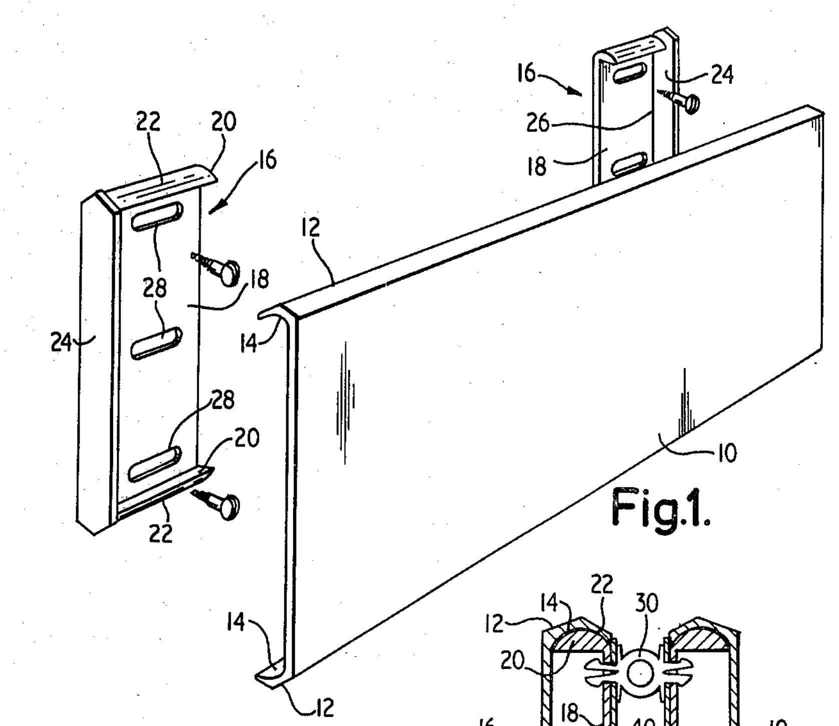
Figure 2:
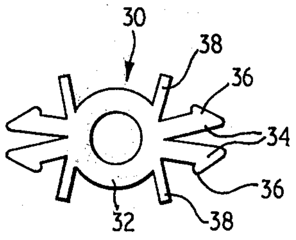
Figure 3:
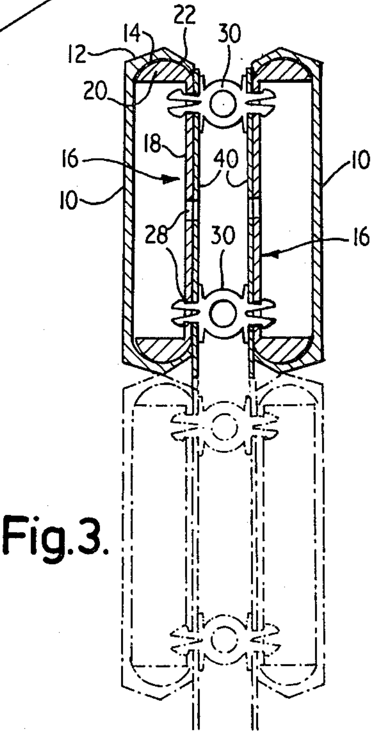

In order that the invention may be more clearly understood, various embodiments will now be described with reference to the accompanying drawings, wherein:

FIG. 1 shows a perspective view of a pair of clips and a plate for mounting thereto, FIG. 2 shows a connecting member for mounting plates back-to-back, and FIG. 3 shows a way in which plates can be mounted together back-to-back.

Referring to the drawings, and firstly to FIG. 1; a sign plate 10, typically extruded from aluminium, is of shallow channel cross-section, having a pair of rearwardly directed flanges 12, the mutually facing surfaces 14 of which are concave. The plate is mounted to a support surface by means of a pair of mounting clips 16, typically moulded from plastics material. Each clip has a flat base member 18, with a pair of parallel ribs 20 projecting therefrom, the mutually remote surfaces 22 of the ribs being convex. The spacing of the ribs corresponds to the spacing between the flanges 12 of the plate 10, so that the plate can be resiliently pushed onto the clip, and is retained by engagement of the convex surfaces 22 of the ribs 20 with the concave surfaces 14 of the flanges 12. The mounting clip 16 is also provided with an end flange 24 which projects from the base member 18 and extends between the ribs 20. It has the same size and shape as the outer cross-section of the plate 10, so that it abuts the end of the plate 10 and provides a neat end closure for the channel. However, the flange 24 is joined to the base member 18 through a thinned region 26 which provides a line of weakening by means of which the flange can be broken away from the base member when not required, for example if the clip is to be used to support the plate at a position midway between its ends. This may be particularly desirable and necessary in the case of long plates, where the central region of the plate might otherwise tend to bow away from the support surface. The base member 18 is provided with three apertures 28 by means of which it can be screwed to a support surface. The apertures are elongate in the direction parallel to the ribs 20, which enables the positions of the clips to be adjusted lengthwise of the plate to ensure that the flanges 24 lie flush against the ends of the plate. Three apertures 28 are provided on each clip. The clip can be secured by two screws through the two outermost apertures, or by a single screw through the central aperture. The latter arrangement provides a greater degree of possible adjustment of the clip, and moreover enables the plate to be more easily detached from the clips. The former arrangement will generally be preferable when it is desired to hold the plate more firmly on the clips.

Referring now to FIGS. 2 and 3; the clips can be used in a different manner to assist in securing plates 10 back-to-back. The plates are mounted to clips 16 in the usual way, but the clips, instead of being secured to a supporting surface, are connected together back-to-back by means of connecting members 30, shown in more detail in FIG. 2. Each connecting member has an annular central portion 32, from diametrically opposite sides of which project two pairs of tongues 34 having dog-tooth formations 36 on their mutually remote surfaces. The tongues of each pair are slightly divergent so that they can be resiliently pressed towards each other. At the base of each pair of tongues adjacent the annulus 32, are stop elements 38. As shown in FIG. 3, the connecting members are used by inserting a pair of tongues 34 through one of the apertures 28 in a clip 16, and pushing them home until the stop elements 38 are pressed against the rear of the base member 18 of the clip. In this position the tongues are retained by engagement of the dog-tooth formations 36 with the edges of the aperture 28. A clip 16 can be mounted to the tongues on each side of the connecting member 30; as many connecting members as necessary being employed to provide a stable connection of two sets of clips back-to-back and one or more clips 16 without the flanges 24 being used intermediate the ends if necessary.

FIG. 3 also shows how a number of pairs of plates joined back-to-back in this way can also be connected one above another using connecting strips 40 having suitably spaced apertures through which the tongues 34 are inserted before insertion into the apertures 28 in the clips 16. The connecting strips 40 are sufficiently thin that they do not interfere with the proper engagement of the tongues in the apertures 28, the stop elements 38 being resiliently deflectable to accommodate the strip.

Instead of strips 40, the pairs of plates may be suspended one above another by interconnecting adjacent connecting members 30 by means for example of S-hooks passed through the annular centres.

The annular centres 32 of the connecting members 30 can be used for the attachment of cords, chains or other means for suspending the plates from an overhead support. Alternatively, they can be used to receive screws at one end of the pair of plates, the screws extending into a support surface, whereby the pair of plates are mounted to that surface so as to project at right angles therefrom. To ensure adequate strength and stability, preferably at least two connecting members are used at that end.

I claim:

1. A mounting clip for a plate of shallow channel cross-section having rearwardly directed flanges with mutually convergent portions on their facing surfaces, the clip having a flat base member for securing to a support surface, a pair of ribs projecting from opposite edges of the base member with the surface between said ribs being free of projections, the mutually remote surface of the ribs having divergent portions for co-operating with the convergent portions of the flanges of a said plate clipped thereto, and an integral end flange projecting from the base member and extending between the ribs for closing the end of the channel of the plate.

2. A mounting clip according to claim 1 wherein the end flange is separable from the base member by a line of weakening, so that it can be broken away when not required.

3. A mounting clip according to claim 1 wherein the base member has apertures through which it can be screwed to a support surface.

4. A mounting clip according to claim 3 wherein the apertures are elongate in the direction parallel to said ribs.

5. A mounting clip according to claim 3 wherein there are two outer apertures adjacent the ribs and a central aperture midway between them.

* * * * *